(12) United States Patent
Mackenzie et al.

(10) Patent No.: US 8,226,157 B2
(45) Date of Patent: Jul. 24, 2012

(54) PILLAR FOR VEHICLE BODY STRUCTURE

(75) Inventors: Megan Kathleen Mackenzie, Ann Arbor, MI (US); Deanna Marie Vargo, Plymouth, MI (US); Paul Edward Harmon, Dexter, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 355 days.

(21) Appl. No.: 12/628,804

(22) Filed: Dec. 1, 2009

(65) Prior Publication Data
US 2011/0127801 A1    Jun. 2, 2011

(51) Int. Cl.
*B62D 25/04* (2006.01)
(52) U.S. Cl. .................................. 296/193.06
(58) Field of Classification Search ............... 296/146.1, 296/146.5, 146.6, 193.05, 193.06, 203.1, 296/205; 49/506; 292/340
See application file for complete search history.

(56) References Cited

U.S. PATENT DOCUMENTS
| | | | |
|---|---|---|---|
| 7,559,599 B2 | 7/2009 | Kaplanov et al. | |
| 7,841,650 B2 * | 11/2010 | Chen et al. | 296/193.06 |
| 2005/0194820 A1 * | 9/2005 | Azzouz et al. | 296/193.05 |
| 2006/0208537 A1 * | 9/2006 | Dingman et al. | 296/193.05 |
| 2009/0008965 A1 * | 1/2009 | Chen et al. | 296/205 |
| 2011/0101734 A1 * | 5/2011 | Gunther et al. | 296/193.06 |

FOREIGN PATENT DOCUMENTS
| | | |
|---|---|---|
| JP | 01186481 A | 7/1989 |
| JP | 10329751 A | 12/1998 |
| JP | 2006273296 A | 10/2006 |

* cited by examiner

*Primary Examiner* — Lori Lyjak
(74) *Attorney, Agent, or Firm* — Gifford, Krass, Sprinkle, Anderson & Citkowski, P.C.

(57) ABSTRACT

The present invention provides a pillar of a vehicle body structure for supporting the roof of an automotive vehicle. The pillar includes an outer panel having a side panel attached to an inner panel. The pillar further includes a first and second reinforcing member. The first reinforcing member has a planar surface and a first reinforcing edge. The second reinforcing member also has a planar surface and a second reinforcing edge. The first reinforcing member is spaced apart from the second reinforcing member, and the first and second reinforcing edges abut against respective side panel and inner panel portions so as to transmit load between the outer panel and the inner panel and reduce deformation of the outer panel under a predetermined load.

11 Claims, 7 Drawing Sheets

PILLAR FOR VEHICLE BODY STRUCTURE

BACKGROUND OF THE INVENTION

1. Field of the Invention

The present invention relates generally to a pillar for a vehicle body structure of an automotive vehicle.

2. Description of Material Art

Pillars for use in vehicle body structures include an outer panel and an inner panel. The outer panel is spaced apart from the inner panel so as to define a chamber which provides an area for wire harness routing and vehicle accessory attachments. Additionally, the pillars are configured to provide structural support to the vehicle. Accordingly it is known to add sheets of material to various locations of the pillar body structure to provide additional reinforcement to the pillar thus providing added rigidity and strength to the vehicle body. However, such current reinforcement design is limited in load transferring capabilities. Namely, the patches are designed to locally add material strength, or those used for load transfer are designed to maintain pillar structure under mainly compressive and shear forces. Current pillars are not configured to maintain structural integrity under tensile forces, such as the pulling force exerted by the door on an attachment mechanism such as a hinge or striker. Therefore current pillars remain susceptible to deformation under such loading conditions, which are representative of an impact to the door rather than directly to the pillar structure. Accordingly a pillar structure is provided that includes load-transferring members connecting the outer and inner panels such that the two panels can act conjointly to disperse the previously mentioned type of loads thus providing greater strength and resistance to deformation than is currently known and used.

SUMMARY OF THE PRESENT INVENTION

The present invention provides a pillar for a vehicle body structure which overcomes the above-mentioned disadvantages of previously known pillars. In brief, the pillar of the present invention includes an inner panel and an outer panel. The outer panel is spaced apart from the inner panel and includes a side panel. The side panel extends generally orthogonal from the outer panel and the outer panel is fixedly attached to the inner panel at the edges.

The pillar further includes a first and second reinforcing member. Both reinforcing members have a planar surface which are nearly orthogonal to the outer and inner panels so as to provide strength in tensile loading through the door. The first reinforcing member is spaced apart from the second reinforcing member. The attachment mechanism is disposed between the first and second reinforcing members.

The pillar may further include a pair of reinforcing side walls. The reinforcing side walls connect the first reinforcing member to the second reinforcing member and are angled relative to each other. The reinforcing side walls are joined along respective side edges so as to form a corner. The reinforcing side walls provide additional local reinforcement as well as a surface for connecting the reinforcing members to the outer and inner panels. The reinforcing side wall may be configured to package or route wire harness and other accessories, while still maintaining contact with respective side and inner panels. Accordingly, this connection allows the reinforcing members to transmit load between the outer and inner panels so as to utilize the combined strength of both panels to further increase the yield strength of the vehicle body structure, more specifically the pillar.

BRIEF DESCRIPTION OF THE DRAWINGS

A better understanding of the present invention will be had upon reference to the following detailed description when read in conjunction with the accompanying drawings, wherein like reference characters refer to like parts throughout the several views and in which.

DETAILED DESCRIPTION OF THE INVENTION

Figure 1:
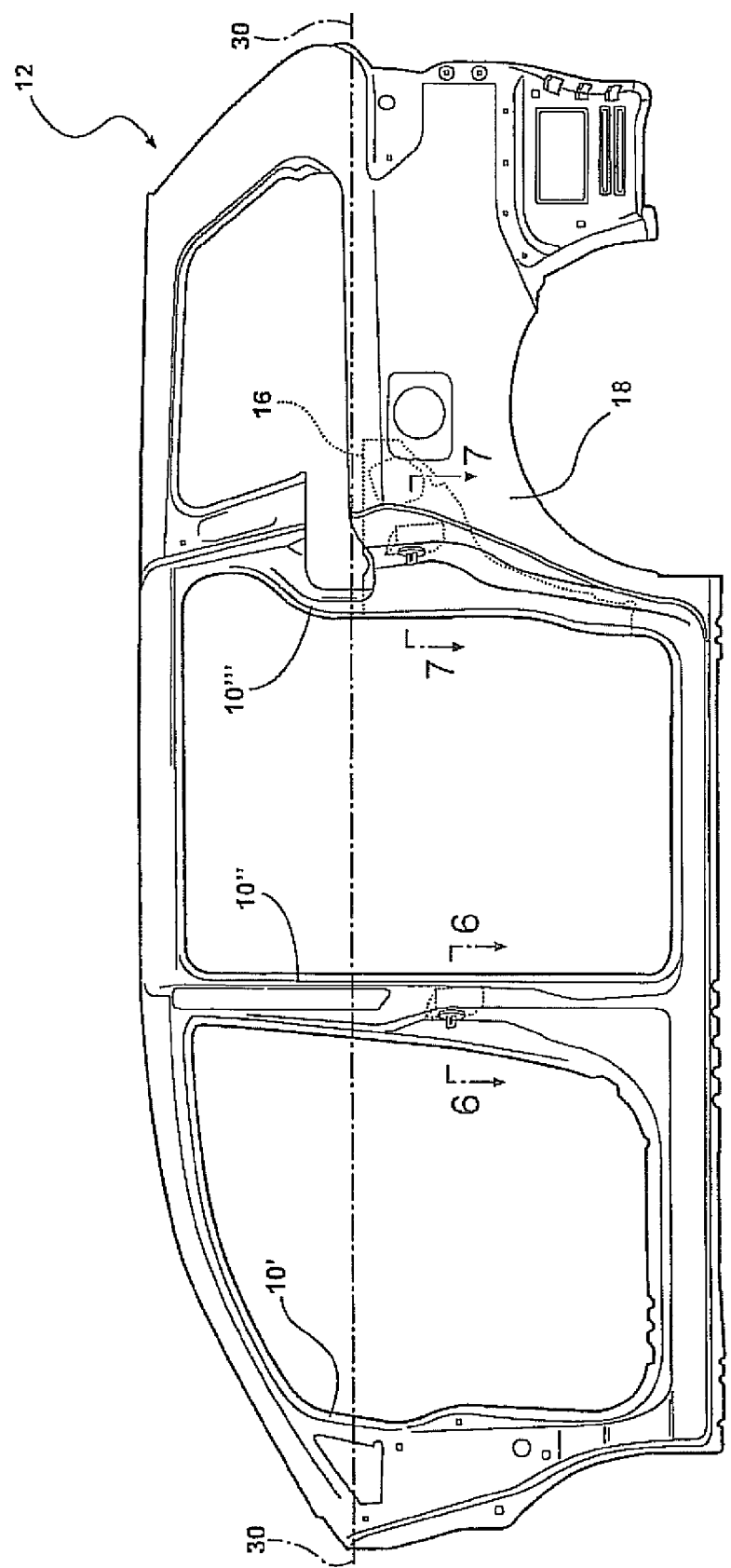
FIG. 1 is a perspective view of a vehicle body.

With reference to FIGS. 1-7, and 10, a first preferred embodiment of a pillar 10 for use in a vehicle body 12 is illustrated. The pillar 10 is located between the vehicle roof (not shown) and the vehicle floor (not shown). Though FIG. 1 provides a vehicle body 12 configured for a four-door vehicle it is anticipated that additional doors may be included and thus more pillars may be added to the vehicle body 12. Furthermore, it should be appreciated that only one side of the vehicle body 12 is shown, and that the opposing side of the vehicle body 12 is generally symmetrical to the other side, and thus explanation of one side is sufficient to describe the other.

With reference again to FIG. 1, the vehicle body 12 is formed by an inner and an outer panel 16, 18. The inner and outer panels 16, 18 may be formed from sheets of material having a ultimate strength of at least 200 megapascals. Such material is currently known and used in the art and includes steel. The inner and outer panels 16, 18 may be stamped out of sheets of steel and are welded together along respective edges so as to form the vehicle pillar 10.

The vehicle body 12 is shown having what is commonly referred to as an A pillar 10', B pillar 10", and a C pillar 10'". The A pillar 10' is disposed generally towards the front of the vehicle and extends from the hood to the roof, and the C pillar 10'" is disposed towards the back of the vehicle and extends from the belt line to the roof. The belt line 30 as used herein is a term of art to describe a horizontal line below the side windows of the vehicle starting from the hood and running to the back of the vehicle 12. As indicated by the dashed line 30, the belt line separates the glass area from the lower body structure. The B pillar 10" is disposed in between the A and C pillars 10', 10'" and segregates the front door from the rear door of the vehicle.

As shown, the pillars 10 extend generally longitudinally from the roof of the vehicle towards the belt line or floor of the vehicle so as to support the roof. The pillar 10 is formed from the inner panel 16 and outer panel 18. The edges of the inner and outer panels 16, 18 are commonly welded together, and a portion of the inner and outer panels 16, 18 are spaced apart from each other. Apertures may be formed along the inner panel 16 so as to provide channels for guiding wire harnesses and other vehicle accessories.

Figure 10:
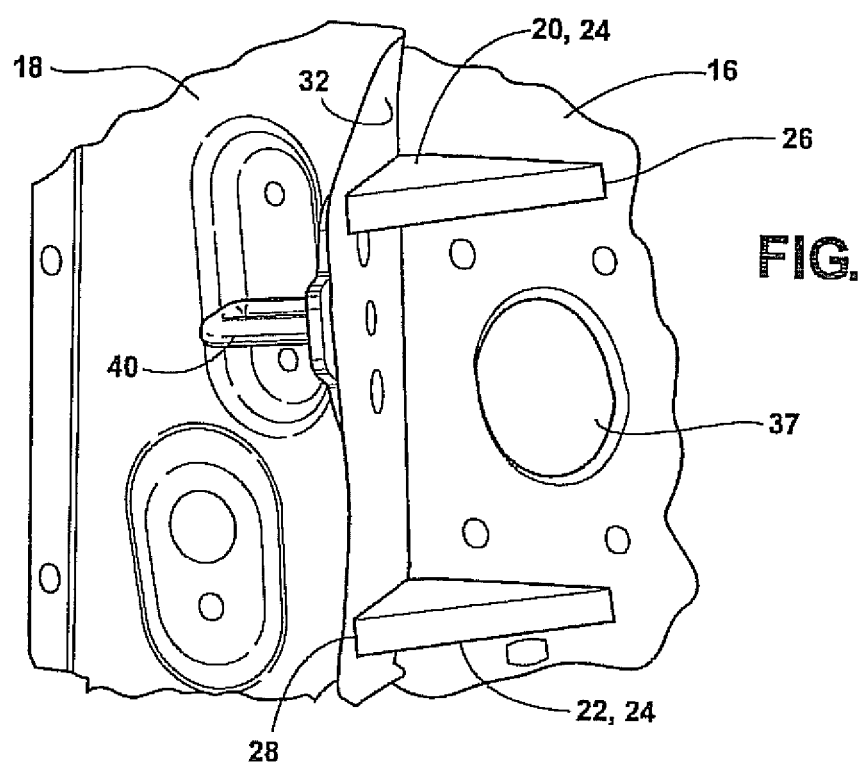
FIG. 10 is another view of a first preferred embodiment of the pillar without the reinforcing side walls.

With reference again to FIG. 10, first and second reinforcing members 20, 22 are provided. The first reinforcing member 20 has a planar surface 24 and a first reinforcing edge 26. The second reinforcing member 22 also has a planar surface 24 and includes a second reinforcing edge 28. The first and second reinforcing edges 26, 28 bound respective first and second reinforcing members 20, 22 so as to define a generally triangular-shaped member, although it should be appreciated that the first and second reinforcing members 20, 22 may be shaped otherwise. The first reinforcing member 20 is spaced apart from the second reinforcing member 22. The planar surfaces 24 of the first and second reinforcing members 20, 22 are generally aligned along a horizontal plane. The first reinforcing member 20 is adjacent to the vehicle belt line 30. The first and second reinforcing members 20, 22 may be formed of a sheet of material as shown in FIG. 5, or may be stamped into one solid piece as shown in FIG. 10.

The second reinforcing member 22 is disposed below the first reinforcing member 20 and is further from the belt line than the first reinforcing member 20. A portion of the first reinforcing edge 26 of the first reinforcing member 20 abuts against the side panel 32, and another portion of the first reinforcing edge 26 of the first reinforcing member 20 abuts against the inner panel 16. Likewise, a portion of the second reinforcing edge 28 of the second reinforcing member 22 abuts against the side panel 32, and another portion of the second reinforcing edge 28 abuts against the inner panel 16. Thus the first and second reinforcing members 20, 22 interconnect the side panel 32 to the inner panel 16 and are operable to transmit load between the outer and inner panels 18, 16 and reduce deformation of the pillar 10 upon application of a load.

Figure 5:
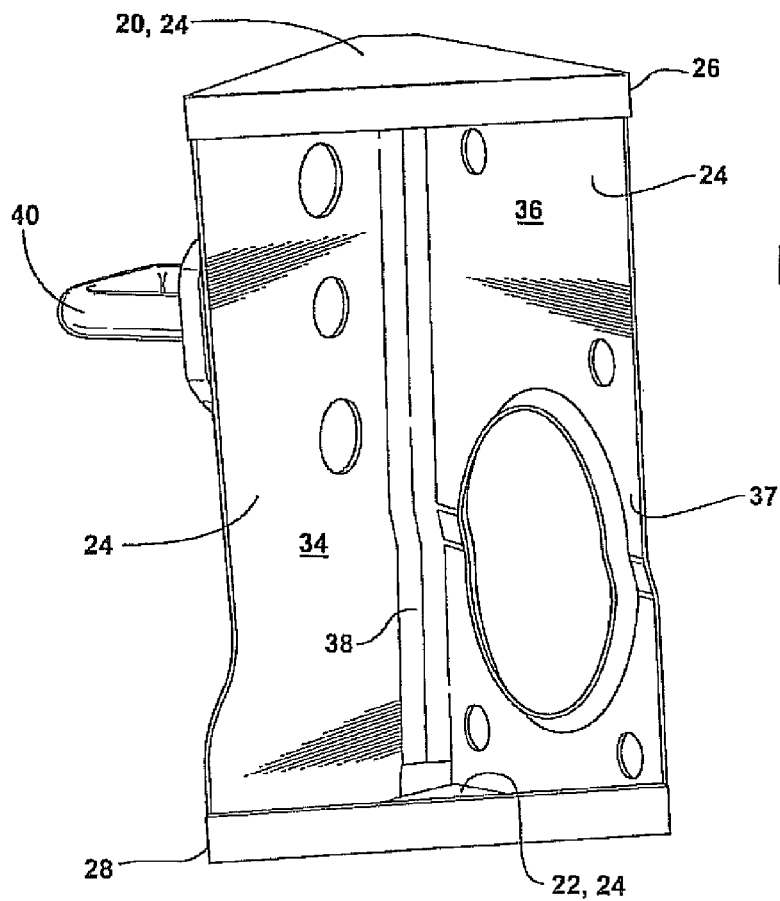
FIG. 5 is an isolated view of the first and second reinforcing members and side walls.

With reference again to FIG. 2, and now to FIG. 5, the pillar 10 may further include first and second reinforcing side walls 34, 36 (also referenced herein as first and second side walls). The first and second side walls 34, 36 connect the first reinforcing member 20 to the second reinforcing member 22. The first and second side walls 34, 36 are generally orthogonal to the first and second reinforcing members 20, 22. The first and second side walls 34, 36 are angled relative to each other and are joined along respective side edges 26, 28 so as to form a corner 38. The corner 38 extends generally linearly between the first reinforcing member 20 and the second reinforcing member 22.

Figure 2:
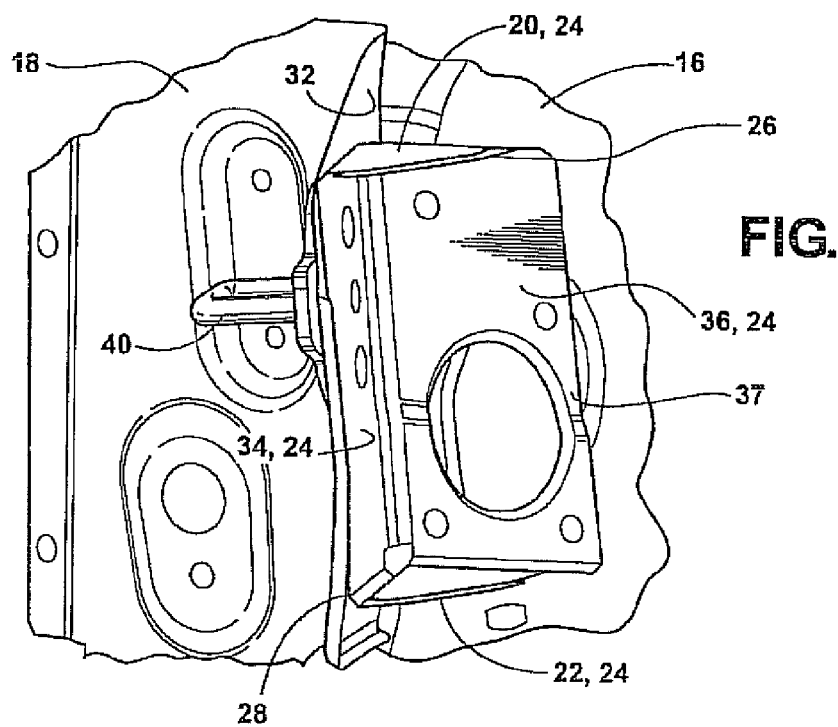
FIG. 2 is a view of a first preferred embodiment of the pillar.
Figure 4:
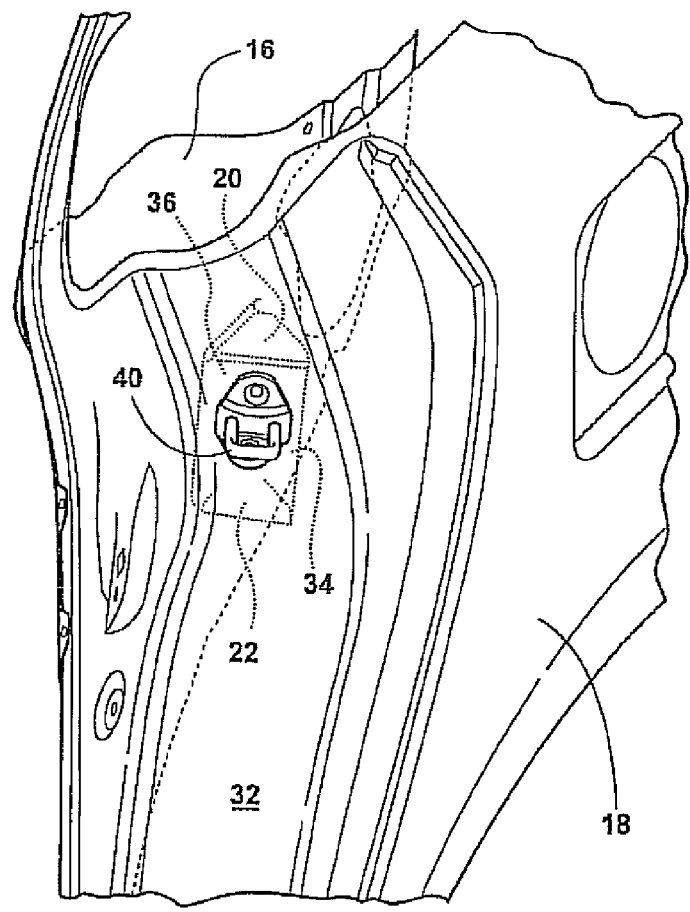
FIG. 4 is a view showing the side panel of the pillar.
Figure 3:
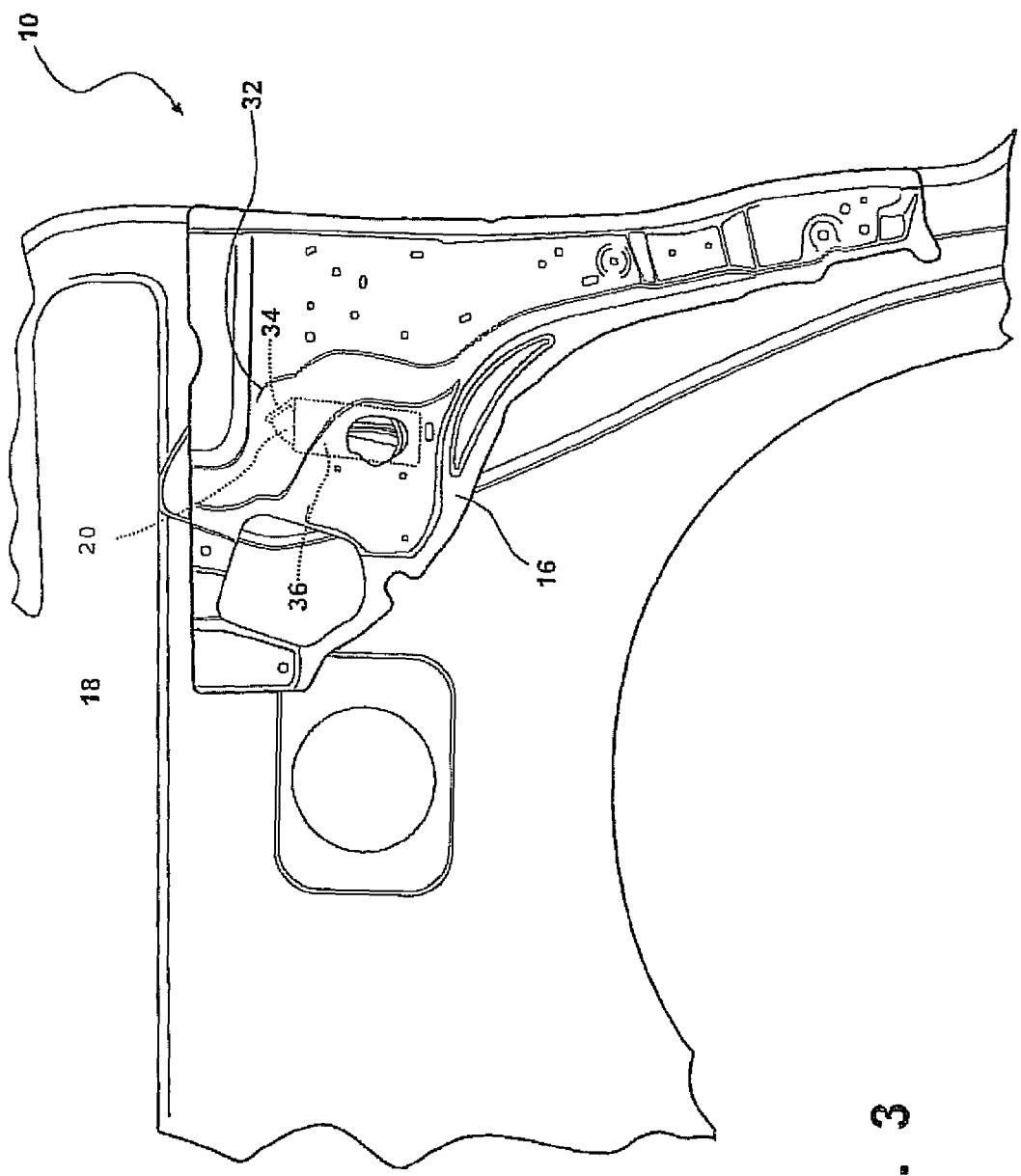
FIG. 3 is a view showing the inner panel of the pillar.

With reference now to FIGS. 2-4, the structure of the pillar is shown. The first and second side walls 34, 36 have a planar surface 24, and the planar surface 24 of first side wall 34 abuts against the side panel 32 and the planar surface 24 of the second side wall 36 abuts against the inner panel 16. The first and second walls 34, 36 may include a portion for accommodating vehicle accessories such as wire harnesses, speakers, seat belt anchors, trim panel mounting ends, and the like. For instance, a portion 37 of the one of the side walls 34, 36 may include an aperture configured to be positioned over like apertures on the inner or outer panel. With reference again to FIG. 5, the second side wall 36 is shown having an aperture for receiving a speaker. The second wall 36 is configured so as to position the aperture over an aperture disposed on the inner panel to accommodate the speaker and electrical wiring. The first and second side walls 34, 36 may be attached to respective side panel 32 and inner panel 16 using methods currently known such as welding, spot welding, bolts, screws and the like.

In operation, the first and second reinforcing members 20, 22 prevent separation between the outer panel 18 and inner panel 16 by connecting the outer panel 18 to the inner panel 16. Upon application of a load on the side panel 32 of the outer panel 18, the planar surface 24 of the first side wall 34 transmits load from the side panel 32 to the inner panel 16. Specifically, the first and second reinforcing edges 26, 28 transfer the load to the inner panel 16 thus helping the side panel 32 retain its position with respect to the inner panel 16.

Figure 7:
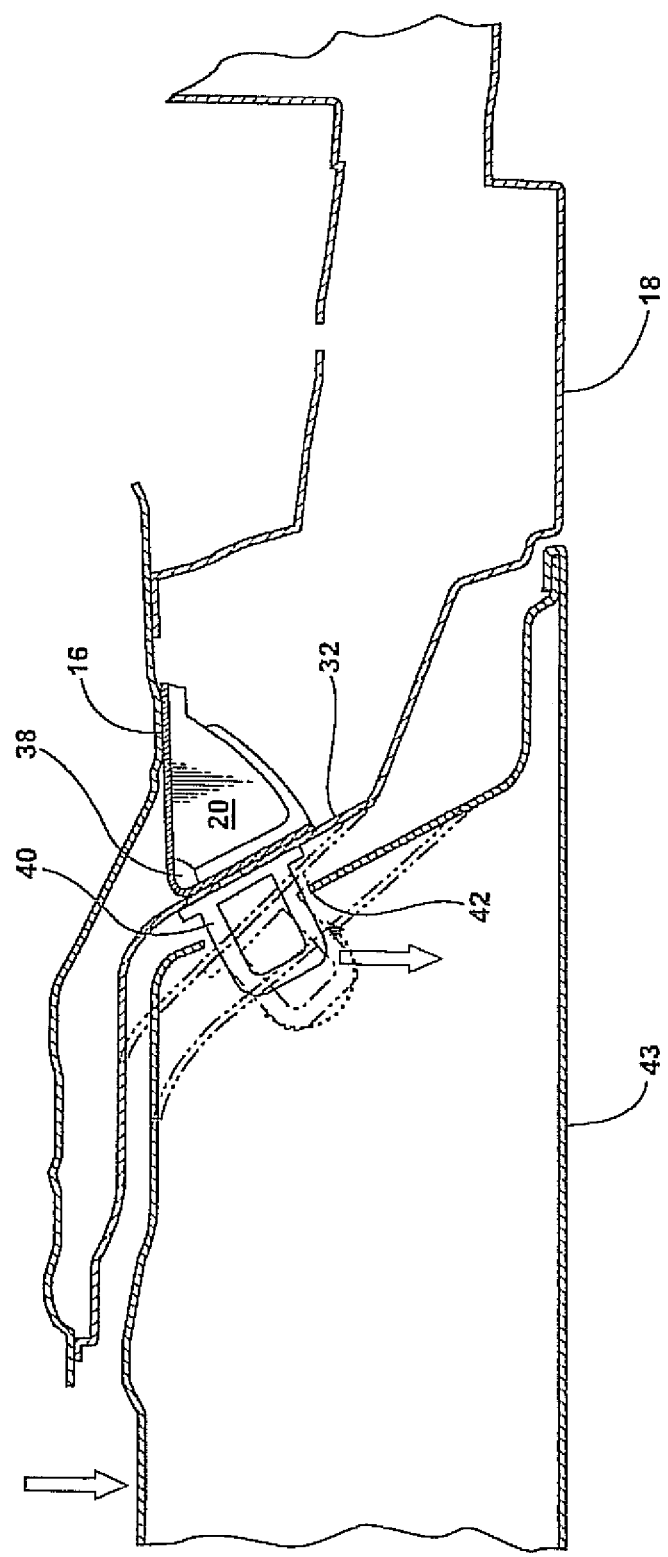
FIG. 7, is a cross section of FIG. 1 taken along lines 7-7 showing the operation of the pillar.

With reference now to FIG. 7, a perspective view of a C pillar 10''' of the vehicle body 12 structure is provided. The C pillar 10''' includes a striker 40. The striker 40 is configured for use with a door latch 42, and the door latch 42 is operable to engage the striker 40 so as to hold the door 43 in a closed position against the side panel 32 of the vehicle body 12 structure. The side panel 32 includes an inner side panel 16, 32 surface opposite an outer side panel 18, 32 surface. The striker 40 is fixedly attached to the outer side panel 18, 32 surface and is disposed between the first and second reinforcing members 20, 22. Specifically, the first and second reinforcing edges 26, 28 of respective first and second reinforcing members 20, 22 are attached to the inner side panel 16, 32 surface of the side panel 32 and interconnect the inner side surface of the side panel 32 to the inner panel 16.

As shown in the diagram, the solid lines indicate the position of the door 43 relative to the pillar 10 before experiencing a load. The dashed lines indicate the position of the door 43 and pillar after experiencing a load. The first reinforcing member 20 is disposed generally above the striker 40 and the second reinforcing member 22 is disposed below the striker 40. The first and second reinforcing edges 26, 28 may be attached to the side and inner panel 32, 16 using commonly known attaching methods such as spot welding, welding, bolts, adhesives, or the like.

Figure 6:
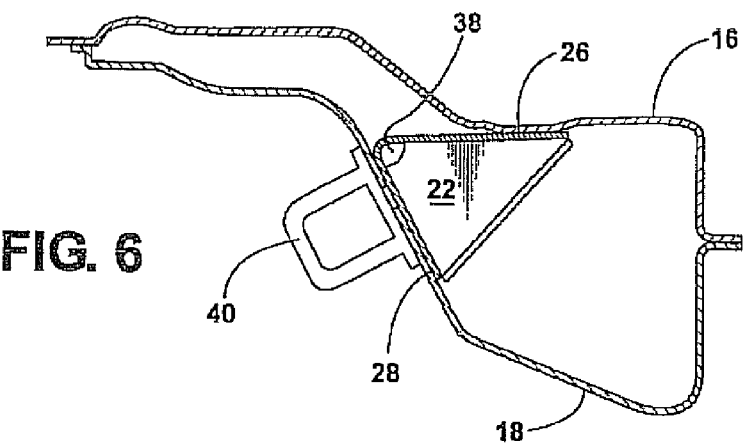
FIG. 6, is a cross section of FIG. 1 taken along lines 6-6.

With reference now to FIG. 6, a cross section of the B pillar 10'' is provided. As with the C pillar 10''', the first and second reinforcing members 20, 22 are disposed between the inner panel 16 and outer panel 18 of the B pillar 10''. The first reinforcing member 20 is spaced apart from the second reinforcing member 22 and is generally adjacent to an attachment mechanism such as a striker 40, or a hinge mounted onto the side panel 32. The second reinforcing member 22 is disposed beneath the first reinforcing member 20 with respect to the belt line 30. Though the striker 40 is shown generally below the belt line 30, it is anticipated that the striker may be located along other portions of the side panel 32. As shown in FIGS. 5 and 6, the first reinforcing edge 26 and second reinforcing edge 28 of respective first and second reinforcing members 20, 22 abut against and are fixed to the side and inner panels 32, 16 and thus transmit a load between the outer and inner panels 18, 16 and reduce deformation the B pillar 10''.

With reference again to FIG. 7, the operation of the pillar is provided. With respect to the C pillar 10''', when the door 43 is closed and the latch mechanism is engaged with the striker 40, application of a load from either within the cabin space or the exterior of the vehicle door 43 results in a pull on the striker 40 which in turn may cause the side panel 32 to become displaced relative to the inner panel 16 in prior art pillar 10 configurations. A load on the closed door 43 may also result on a moment placed upon the striker 40. The moment and the load are indicated generally by the arrows shown in FIG. 7.

As discussed above the first and second reinforcing members 20, 22 interconnect the side panel 32 of the outer panel 18 with the inner panel 16 so as to reinforce the side panel 32 and help the pillar 10 resist deformation. The first and second side walls 34, 36 are fixed to respective side and inner panels 32, 16, and help transmit the moment and loads placed on the side panel 32 to the inner panel 16. Furthermore, the first and second side walls 34, 36 provide a greater surface area of the inner panel 16 for which the load experienced by the side panel 32 may be transmitted. The corner 38 also serves an important function in terms of maintaining the spatial relationship between the side panel 32 and the inner panel 16. Specifically, as a moment and a load are placed upon the side panel 32, the corner 38 provides added reinforcement to prevent the side panel 32 from being pulled away from the inner panel 16. The corner 38 provides more material, and accommodates the addition of the side walls within the space defined between the inner and outer panels 20, 22. Thus, the added material further reinforces the pillar 10 and helps reduce deformation under predetermined load conditions. It should be appreciated by those skilled in the art that the deformation would be greater under the same load and moment if the pillar did not include the first and second reinforcing members 20, 22.

Figure 8:
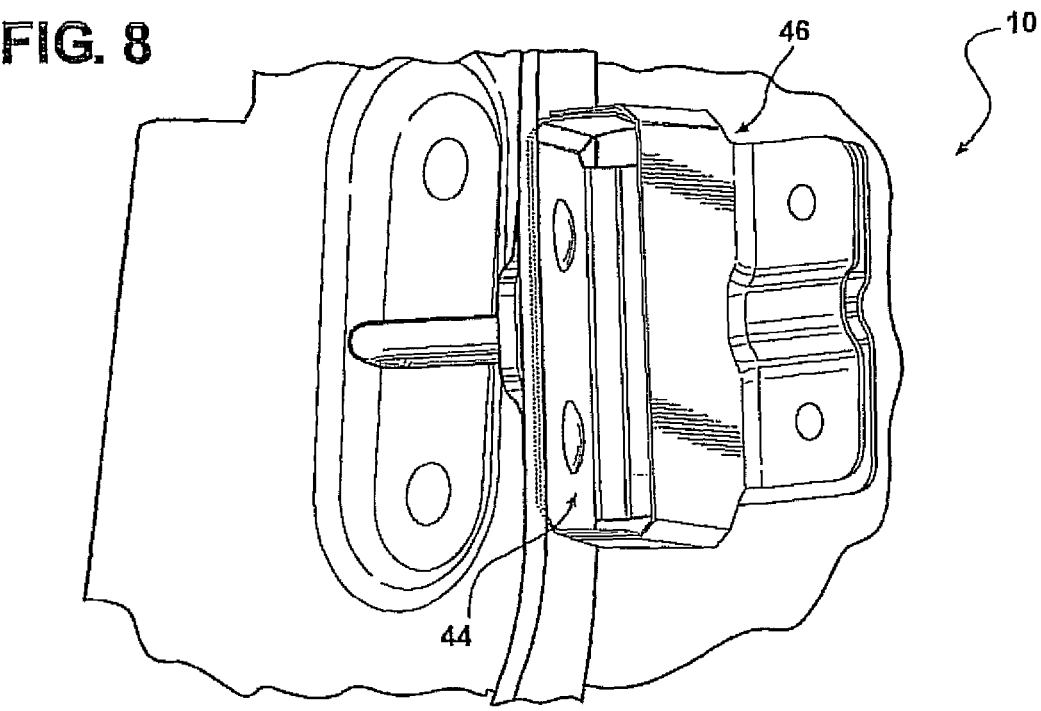
FIG. 8 is a perspective view of a second preferred embodiment of the pillar.
Figure 9:
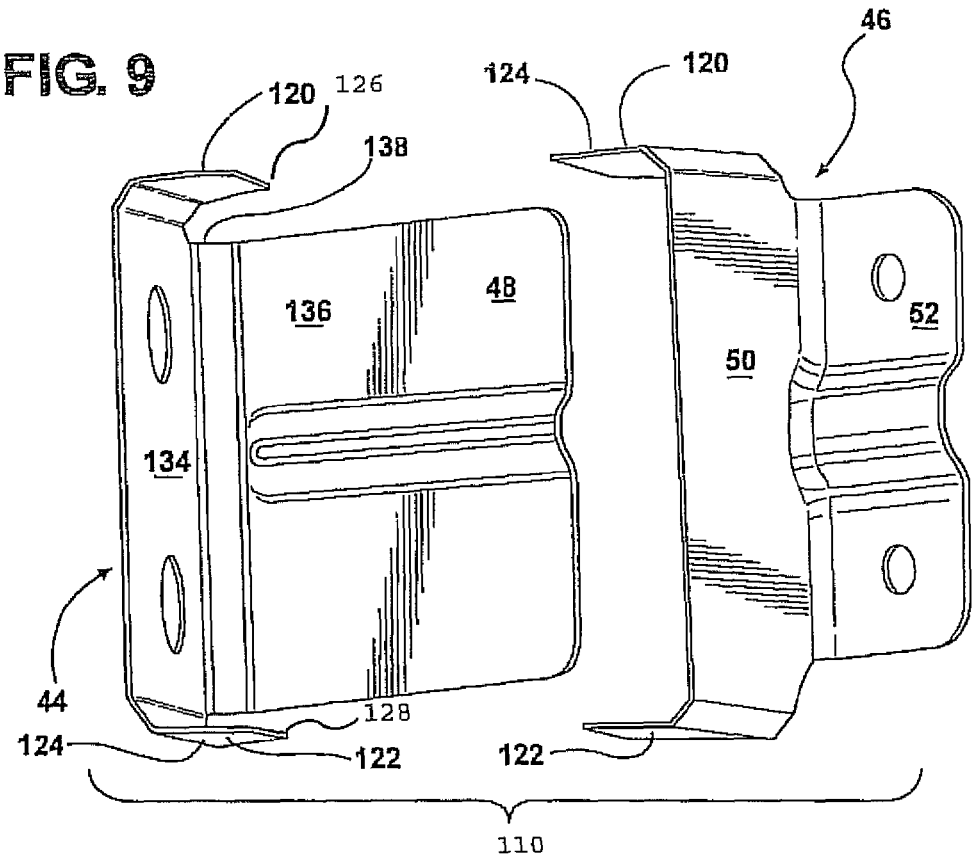
FIG. 9 is an exploded view of the second preferred embodiment of the pillar.

With reference now to FIGS. 8 and 9, a second preferred embodiment of the pillar 110 is provided, wherein like parts are indicated by like reference numerals increased by 100. The pillar 110 includes a first reinforcing bracket 44 and a second reinforcing bracket 46. The first reinforcing bracket 44 includes a first reinforcing member 120 spaced apart from a second reinforcing member 122. The first reinforcing member 120 has a planar surface 124 and a first reinforcing edge 126. The second reinforcing member 122 also has a planar surface 124 and includes a second reinforcing edge 128. The first and second reinforcing edges 126, 128 bound respective first and second reinforcing members 120, 122. The second reinforcing member 122 is disposed below with respect to the belt line of the vehicle 14, and the striker 40 is disposed between the first and second reinforcing members 120, 122.

The first reinforcing bracket 44 further includes first and second side walls 134, 136. The first and second side walls 134, 136 of the first bracket connect the first reinforcing member 120 to the second reinforcing member 122. The first and second side walls 134, 136 are generally orthogonal to the first and second reinforcing members 120, 122. The first and second side walls 134, 136 are angled relative to each other and are joined along respective side edges 126, 128 so as to form a corner 138. The corner 138 extends generally linearly between the first reinforcing member 120 and the second reinforcing member 122. The first and second side walls 134, 136 have a planar surface 124, and the planar surface 124 of the first side wall 134 abuts against the outer panel 118 and the planar surface 124 of the second side wall 136 abuts against the inner panel 116.

The first reinforcing bracket 44 further includes a first plate 48 extending outwardly from the second side wall 136. The first plate 48 may be formed integrally with the second side wall 136 and made of the same material. The first plate 48 provides a greater surface area for which load and moment experienced by the striker 140 may be transferred to the inner panel 116. The first plate 48 is fixed to the inner panel 16, using known techniques such as welding, spot welding, or the use of fasteners such as studs, screws, bolts or the like.

The second reinforcing bracket 46 also includes a first reinforcement member spaced apart from a second reinforcing member 122. The first reinforcing member 120 has a planar surface 124 and a first reinforcing edge 126. The second reinforcing member 122 also has a planar surface 124 and includes a second reinforcing edge 128. The first and second reinforcing edges 126, 128 bound respective first and second reinforcing members 120, 122. The second reinforcing member 122 is disposed below with respect to the belt line of the vehicle 14, and the striker 40 is disposed between the first and second reinforcing members 120, 122.

The second reinforcing bracket 46 further includes a third side wall 50. The third side wall 50 connects the first reinforcing member 120 to the second reinforcing member 122. The third side wall 50 is slightly longer than the first and second side walls 134, 136 of the first reinforcing bracket 44 so as to place the first and second reinforcement members 120, 122 of the second reinforcing bracket 46 in an overlaying position with respective first and second reinforcement members 120, 122 of the first reinforcing bracket 44. The second bracket includes a second plate 52 extending generally orthogonal from the third side wall 50. The second plate 52 is fixed attached to the first plate 48 so as to facilitate the transfer of load and moment.

Accordingly, the present invention provides reinforcement to that side panel 32 by combining the structural strength of the inner panel 16 to the side panel 32 and thus as a load from the interior or exterior is applied to the door 43, the load is absorbed by the attachment of the inner panel 16 to the vehicle body 12 and thus helps reduce deformation of the side panel 32.

Obviously many modifications and variations of the present invention are possible in light of the above teachings and may be practiced otherwise than as specifically described while within the scope of the appended claims.

We claim:

1. A pillar for use in a vehicle body structure, the pillar for supporting the roof of an automotive vehicle, the pillar comprising:
    an inner panel;
    an outer panel having a side panel, and a portion of the outer panel is spaced apart from the inner panel and the inner panel is fixedly attached to the side panel; and
    a first reinforcing member having a planar surface and a first reinforcing edge, and a second reinforcing member having a planar surface and a second reinforcing edge, and the first reinforcing member is spaced apart from the second reinforcing member, and the first and second reinforcing edges abut against the side panel and inner panel.

2. The pillar as set forth in claim 1, wherein the pillar further includes a pair of side walls connecting the first reinforcing member to the second reinforcing member, and the pair of side walls are angled relative to each other and joined along respective side edges so as to form a corner.

3. The pillar as set forth in claim 2, wherein each of the pair of side walls has a planar surface, and the planar surface of one of the pair of side walls is fixed to the outer panel, and the planar surface other of the pair of side walls is fixed to the inner panel.

4. The pillar as set forth in claim 3, further including a striker, and the side panel includes an inner side panel surface opposite an outer side panel surface, the striker fixedly attached to the outer side panel surface between the first and second reinforcing members.

5. The pillar as set forth in claim 3, wherein the first and second reinforcing members are made of material having a ultimate strength of at least 200 megapascals.

6. The pillar as set forth in claim 3, wherein the pair of side walls includes at least one portion configured to support any one vehicle accessory selected from the group consisting of: speakers, seat belt anchors, and trim panel.

7. The pillar as set forth in claim 3, wherein the pillar is a rear pillar of the vehicle body structure.

8. The pillar as set forth in claim 1, whereby the first and second reinforcing edges are welded to the side and inner panels.

9. The pillar as set forth in claim 1, whereby the first and second reinforcing edges are bolted to the side and inner panels.

10. A pillar for use in a vehicle body structure, the pillar for supporting an automotive vehicle, the pillar comprising:
   an inner panel;
   an outer panel having a side panel, and a portion of the out panel is spaced apart from the inner panel and the inner panel is fixedly attached to the side panel; and
   a first reinforcing bracket and a second reinforcing bracket each having a first reinforcing member spaced apart a second reinforcing member, the first reinforcing member having a planar surface and a first reinforcing edge, and the second reinforcing member having a planar surface and a second reinforcing edge, and the first and second reinforcing edges abut against the side panel and inner panel; and the first reinforcing bracket having a first and second side walls interconnecting the first reinforcing member to the second reinforcing member of the first reinforcing bracket, the first and second side walls each having a planar surface, and the planar surface of first side wall is fixed to the outer panel, and the planar surface of second side wall is fixed to the inner panel, and the second reinforcing bracket includes a third side wall interconnecting the first reinforcing member to the second reinforcing member of the second reinforcing bracket.

11. The pillar as set forth in claim 9, wherein the second side wall has a first plate, and the third side wall has a second plate, and the third side wall is slightly longer than the first and second side walls so as to place the second plate in an overlapping position with the first plate, and the first and second reinforcing members of the first reinforcing bracket in an overlapping position with the first and second reinforcing members of the second reinforcing bracket.

* * * * *

UNITED STATES PATENT AND TRADEMARK OFFICE
CERTIFICATE OF CORRECTION

PATENT NO. : 8,226,157 B2  
APPLICATION NO. : 12/628804  
DATED : July 24, 2012  
INVENTOR(S) : Megan Kathleen Mackenzie et al.

Page 1 of 1

It is certified that error appears in the above-identified patent and that said Letters Patent is hereby corrected as shown below:

In the Specification

Col. 4, line 51: replace "deformation the" with --deformation of the--;

In the Claims

Col. 7, line 10: replace "out" with --outer--.

Signed and Sealed this
Twenty-fourth Day of December, 2013

Margaret A. Focarino
*Commissioner for Patents of the United States Patent and Trademark Office*